United States Patent
Li et al.

(10) Patent No.: US 9,055,011 B2
(45) Date of Patent: Jun. 9, 2015

(54) METHODS AND APPARATUS FOR LINKED-LIST CIRCULAR BUFFER MANAGEMENT

(75) Inventors: Chengzhou Li, Bridgewater, NJ (US); Ximing M. Chen, Ringoes, NJ (US); Herbert B. Cohen, Allentown, PA (US)

(73) Assignee: INTEL CORPORATION, Santa Clara, CA (US)

( * ) Notice: Subject to any disclaimer, the term of this patent is extended or adjusted under 35 U.S.C. 154(b) by 40 days.

(21) Appl. No.: 12/872,722

(22) Filed: Aug. 31, 2010

(65) Prior Publication Data

US 2012/0051366 A1 Mar. 1, 2012

(51) Int. Cl.
*H04L 12/54* (2013.01)
*H04L 12/883* (2013.01)
*H04L 12/861* (2013.01)

(52) U.S. Cl.
CPC ........ *H04L 49/9015* (2013.01); *H04L 49/9057* (2013.01)

(58) Field of Classification Search
CPC .................................................. H04L 12/5694
USPC ......... 370/412, 413, 414, 415, 416, 417, 418, 370/428, 394, 474
See application file for complete search history.

(56) References Cited

U.S. PATENT DOCUMENTS

| | | | | |
|---|---|---|---|---|
| 4,238,842 A * | 12/1980 | Aichelmann, Jr. | ............ | 365/222 |
| 5,278,830 A * | 1/1994 | Kudo | .............................. | 370/232 |
| 5,873,089 A * | 2/1999 | Regache | ................................ | 1/1 |
| 6,016,315 A * | 1/2000 | Chambers et al. | ............ | 370/378 |
| 6,523,060 B1 * | 2/2003 | Kao | ............................... | 709/202 |
| 6,594,270 B1 * | 7/2003 | Drummond-Murray et al. | .............................. | 370/412 |
| 6,760,826 B2 * | 7/2004 | Ozdemir et al. | .............. | 711/170 |
| 7,349,403 B2 * | 3/2008 | Lee et al. | .................. | 370/395.21 |
| 7,536,488 B2 * | 5/2009 | Chen et al. | ....................... | 710/56 |
| 7,930,349 B2 * | 4/2011 | Hussain et al. | ............... | 709/205 |

(Continued)

FOREIGN PATENT DOCUMENTS

WO WO 03/007558 1/2003

OTHER PUBLICATIONS

Traboulsi et al., An Efficient Hardware Architecture for Packet Resequencing in Network Processors MPSoCs, 2009 12th Euromicro Conference on Digital System Design/Architectures, Methods and Tools, IEEE Computer Society, pp. 11-18.

(Continued)

*Primary Examiner* — Ian N Moore
*Assistant Examiner* — Phong La
(74) *Attorney, Agent, or Firm* — Sheridan Ross, PC

(57) ABSTRACT

A buffer memory is provided that comprises a plurality of memory elements for storing data elements in an order of arrival, wherein the plurality of memory elements have a variable size and wherein each memory element comprises a pointer (such as a next block starting index) to a memory element storing a next data element. Additionally, each memory element optionally further comprises a block size field indicating the variable size and/or a sequence number field indicating a sequence number of the corresponding data element. The buffer memory optionally comprises a largest sequence variable to store a sequence number of a data element in the buffer memory having a largest sequence number. The largest sequence variable is updated if a newly arrived data element has a sequence number that is larger than the largest sequence variable. A method is also provided for managing the disclosed buffer memories.

21 Claims, 5 Drawing Sheets

(56) References Cited

U.S. PATENT DOCUMENTS

| | | | | |
|---|---|---|---|---|
| 8,122,140 | B2* | 2/2012 | Barreto et al. | 709/231 |
| 8,139,593 | B2* | 3/2012 | Dravida et al. | 370/412 |
| 8,312,243 | B2* | 11/2012 | Balan et al. | 711/170 |
| 2003/0026277 | A1* | 2/2003 | Pate et al. | 370/412 |
| 2003/0063618 | A1* | 4/2003 | Khacherian et al. | 370/413 |
| 2005/0187985 | A1* | 8/2005 | Edwards et al. | 707/200 |
| 2005/0278508 | A1* | 12/2005 | Vasekin et al. | 712/210 |
| 2005/0286526 | A1* | 12/2005 | Sood et al. | 370/394 |
| 2006/0267996 | A1* | 11/2006 | Wang et al. | 345/558 |
| 2007/0081558 | A1* | 4/2007 | Shaikli | 370/474 |
| 2007/0230493 | A1* | 10/2007 | Dravida et al. | 370/412 |
| 2009/0143063 | A1* | 6/2009 | Tseng | 455/422.1 |
| 2010/0250767 | A1* | 9/2010 | Barreto et al. | 709/231 |
| 2012/0051366 | A1* | 3/2012 | Li et al. | 370/412 |

OTHER PUBLICATIONS

Meitinger et al., A Hardware Packet Re-Sequencer Unit for Network Processors, 2008, pp. 1-17.

* cited by examiner

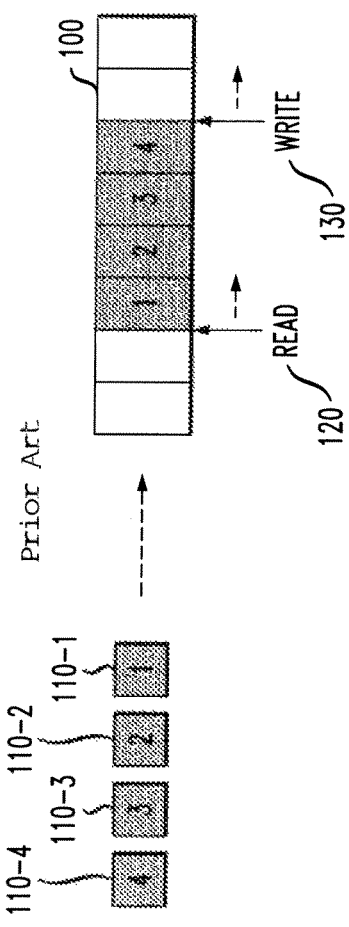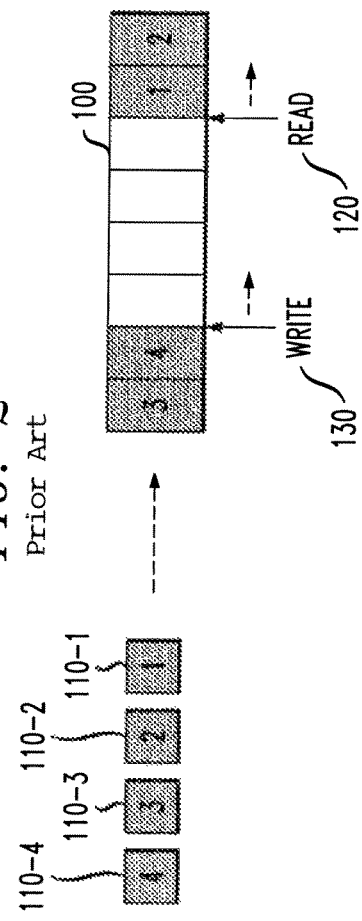
FIG. 1
Prior Art
FIG. 2
Prior Art

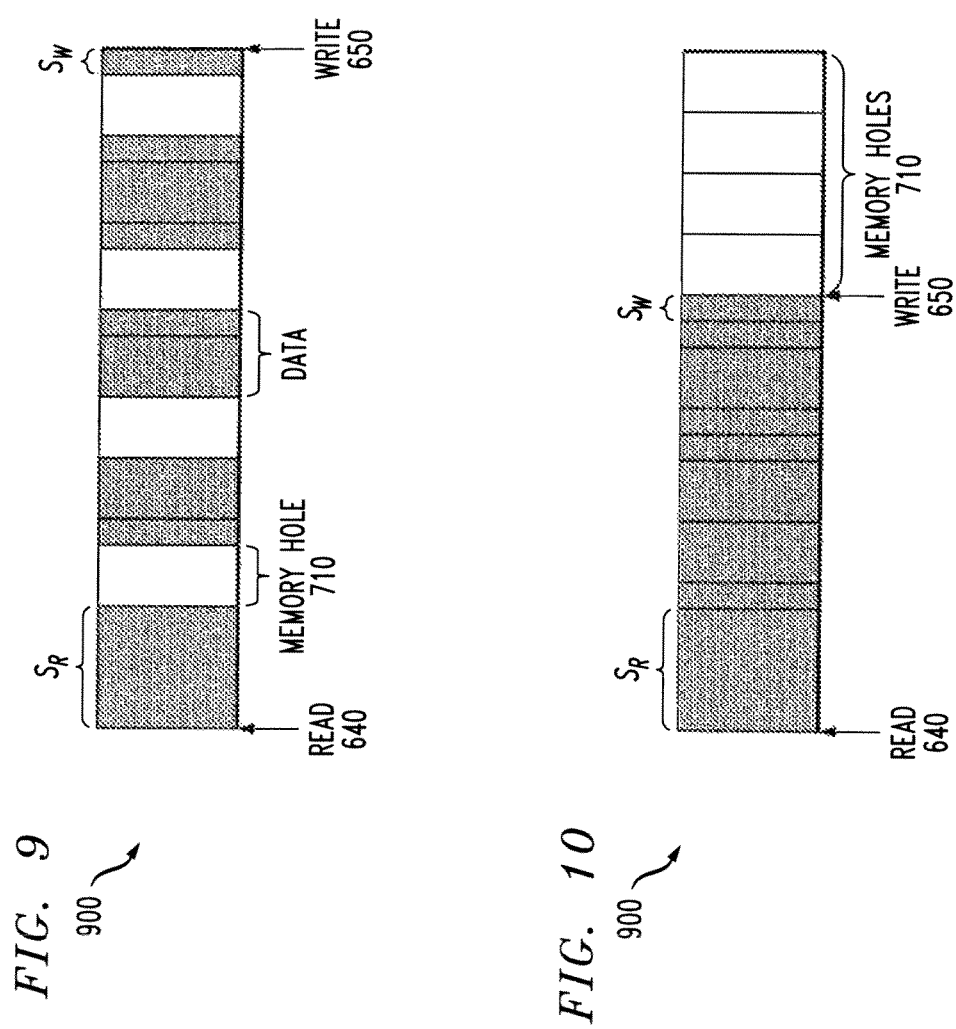

METHODS AND APPARATUS FOR LINKED-LIST CIRCULAR BUFFER MANAGEMENT

FIELD OF THE INVENTION

The present invention relates generally to buffer storage schemes and more particularly, to methods and apparatus for improved buffer schemes that can dynamically allocate buffer space and reorder packets.

BACKGROUND OF THE INVENTION

Embedded network systems typically have a limited memory capacity. Thus, the available memory must be used efficiently. In network receivers, for example, packets of various sizes are received over the network. Circular buffers (CBs) are often employed to efficiently store the received packets. Circular buffers read and write data sequentially. Generally, when packets arrive, they are stored in the circular buffer in the order of arrival. The sequential read property, however, makes it difficult for circular buffers to process packets that are not processed in sequence. For example, circular buffers are not able to directly process packets that arrive out-of-order or to process packets that are lost and recovered at a later time. Additional buffers are thus often employed with circular buffers to reorder packets after being read from a circular buffer.

Another buffer scheme is a Linked List Buffer (LLB). In LLBs, a fixed-size buffer is typically pre-allocated for incoming packets. Thus, the allocated size must be able to store the largest anticipated packet. Otherwise, packets exceeding the allocated size may be dropped. However, much of the allocated buffer space is wasted, as only a small portion of the stored packets require the full allocated size. Separate packets may be stored in different locations of an LLB, but are linked together. Thus, LLBs are a suitable candidate for applications requiring packet re-ordering.

A need exists for an improved buffer scheme that can dynamically allocate buffer space, while also being able to reorder packets.

SUMMARY OF THE INVENTION

Generally, methods and apparatus are provided for linked-list circular buffer management. According to one aspect of the invention, a buffer memory is provided that comprises a plurality of memory elements for storing data elements in an order of arrival, wherein the plurality of memory elements have a variable size and wherein each memory element comprises a pointer (such as a next block starting index) to a memory element storing a next data element. Additionally, each memory element optionally further comprises a block size field indicating the variable size and/or a sequence number field indicating a sequence number of the corresponding data element.

In one exemplary implementation, the buffer memory also comprises a largest sequence variable to store a sequence number of a data element in the buffer memory having a largest sequence number. The largest sequence variable identifies a location of the data element in the buffer memory having a largest sequence number. The largest sequence variable is updated if a newly arrived data element has a sequence number that is larger than the largest sequence variable.

According to another aspect of the invention, a method is provided for managing a buffer memory, by storing data elements in a plurality of memory elements based on order of arrival, wherein the plurality of memory elements have a variable size; and updating a pointer in each of the memory elements to point to a memory element storing a next data element. The pointer is updated if a newly arrived data element has arrived out of sequence. A data element is read from the buffer memory by reading a data element from a head of an ordered list. A memory hole in the buffer memory can be dissolved by a read pointer moving forward to skip a reading of the memory element associated with the memory hole. The buffer memory can be defragmented by copying one or more memory fragments towards a direction of a read pointer or a write pointer.

A more complete understanding of the present invention, as well as further features and advantages of the present invention, will be obtained by reference to the following detailed description and drawings.

BRIEF DESCRIPTION OF THE DRAWINGS

FIG. 1 illustrates an exemplary conventional circular buffer;

FIG. 2 illustrates the exemplary conventional circular buffer of FIG. 1 after the write pointer has wrapped around to the beginning of the buffer;

FIG. 9 illustrates a memory fragment in a linked list circular buffer; and

FIG. 10 illustrates a memory defragmentation operation in accordance with an embodiment of the present invention.

DETAILED DESCRIPTION

The present invention provides a linked list circular buffer (LLCB) scheme that can accommodate packets of various sizes and also perform packet reordering. FIG. 1 illustrates an exemplary conventional circular buffer 100. As shown in FIG. 1, when packets 110-1 through 110-4 arrive, the packets 110-1 through 110-4 are stored in the buffer 100 in the order of arrival. The circular buffer 100 is managed using a read pointer 120 and a write pointer 130. The read pointer 120 points to the buffer position from which data will be read in the next read operation. Similarly, the write pointer 130 points to the buffer position where data can be written.

FIG. 2 illustrates the exemplary conventional circular buffer 100 of FIG. 1 after the write pointer 130 has wrapped around to the beginning of the buffer 100. When the write pointer 130 reaches the boundary of the buffer 100, the write pointer 130 will wrap around to the beginning of the buffer 100, as shown in FIG. 2. It is noted that in the exemplary embodiment, the read pointer 120 and the write pointer 130 move to the right in the figures. In alternate embodiments, the read pointer 120 and the write pointer 130 could move to the left, as would be apparent to a person of ordinary skill in the art.

Figure 3:
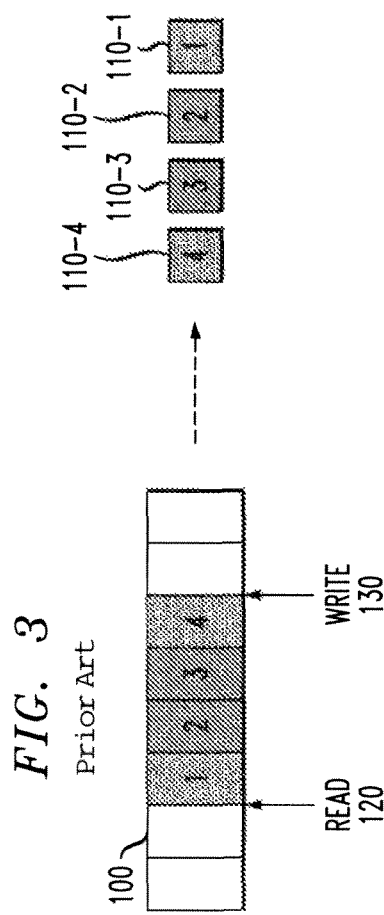
FIG. 3 illustrates the sequential property of the exemplary conventional circular buffer of FIG. 1.

FIG. 3 illustrates the sequential property of the exemplary conventional circular buffer 100 of FIG. 1. As shown in FIG. 3, the circular buffer 100 exhibits a consistent reading and writing sequence. The circular buffer 100 must read the packets 110-1 through 110-4 in the same order as the packets are written into the buffer 100. If one or more packets 110-1 through 110-4 arrive out of order (not in sequence), the out-of-order packets, such as packets 110-2 and 110-3, are stored out of order and then read out out-of-order. An extra buffer (not shown) is then required to reorder those packets.

Figure 4:
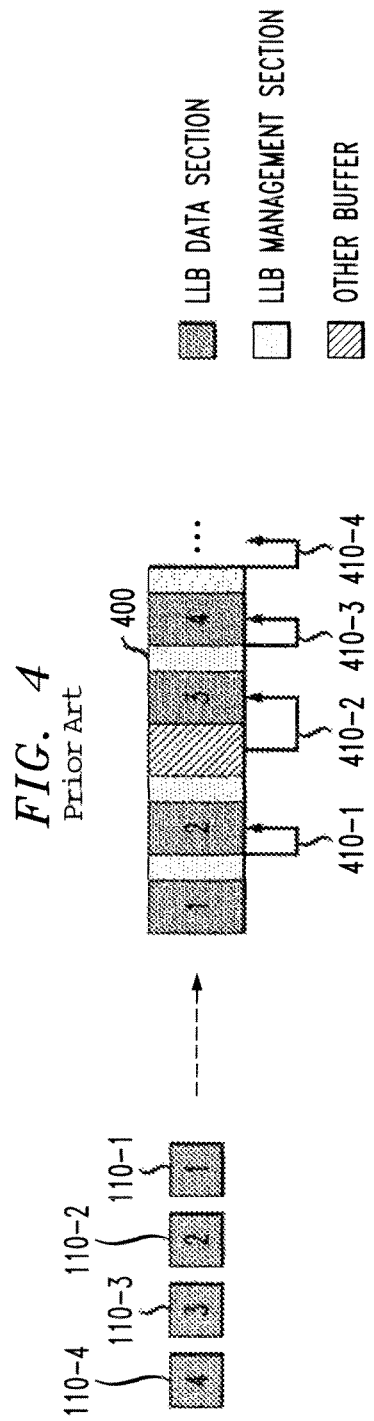
FIG. 4 illustrates an exemplary conventional linked list buffer.

FIG. 4 illustrates an exemplary conventional linked list buffer 400. As shown in FIG. 4, when packets 110-1 through 110-4 arrive, the packets 110-1 through 110-4 are stored in the buffer 400 in the order of arrival. As previously indicated, linked list buffers 400 pre-allocate a fixed size buffer for each incoming packet. The allocated size must be able to store the largest packet. Otherwise, packets exceeding the allocated size may be dropped. However, some of the allocated buffer space is wasted, as only a small portion of the stored packets require the full allocated size.

Linked list buffers 400 do not require that the buffer space for each packet 110 is continuous. Separate packets 110 may be stored in different locations but are linked together using pointers, which makes the packet insertion and removal easy. Thus, linked list buffers 400 are excellent candidates for packet re-ordering. As shown in FIG. 4, each entry in a linked list buffer 400 typically comprises a data section and a management section, which stores a pointer 410 to the location of the next linked buffer.

Linked List Circular Buffer Management

As previously indicated, the present invention provides a linked list circular buffer (LLCB) scheme that can store packets of various sizes and also perform packet reordering. Generally, as discussed hereinafter, the disclosed linked list circular buffers combine aspects of the circular buffers 100 and linked list buffers 400.

Figure 5:
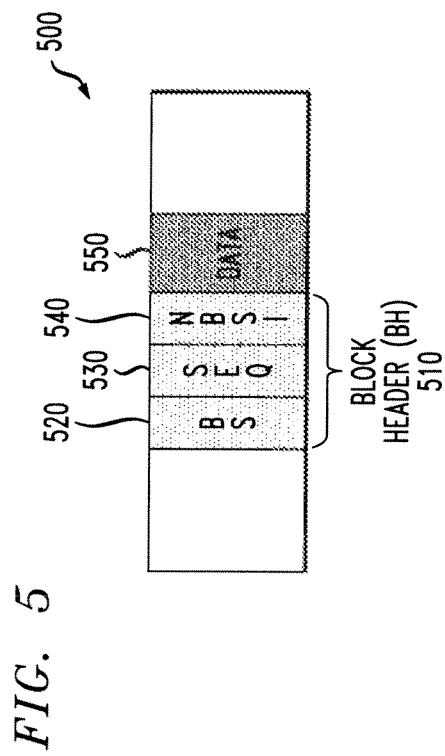
FIG. 5 illustrates an exemplary linked list circular buffer that incorporates features of the present invention.

FIG. 5 illustrates an exemplary linked list circular buffer 500 that incorporates features of the present invention. As shown in FIG. 5, each data block in the exemplary linked list circular buffer 500 has a Block Header (BH) 510 and a data section 550. The exemplary Block Header 510 comprises three fields: a Block Size (BS) 520 of its data section, a Sequence Number (SEQ) 530 of this block and a Next Block Starting Index (NBSI) 540. Generally, entries in the linked list circular buffer 500 can have various sizes and can wrap to the beginning of the buffer 500, in a similar manner to the circular buffer 100 of FIG. 1.

When a new packet arrives, the new packet will be encapsulated with a block header 510. This new data block (comprised of the packet and the block header 510) is added into the tail of the linked list circular buffer 500, in a similar manner to the circular buffer 100 of FIG. 1. The sequence number of the new packet will be evaluated and the NBSI values of related data blocks will be updated accordingly, as shown in FIG. 6.

Figure 6:
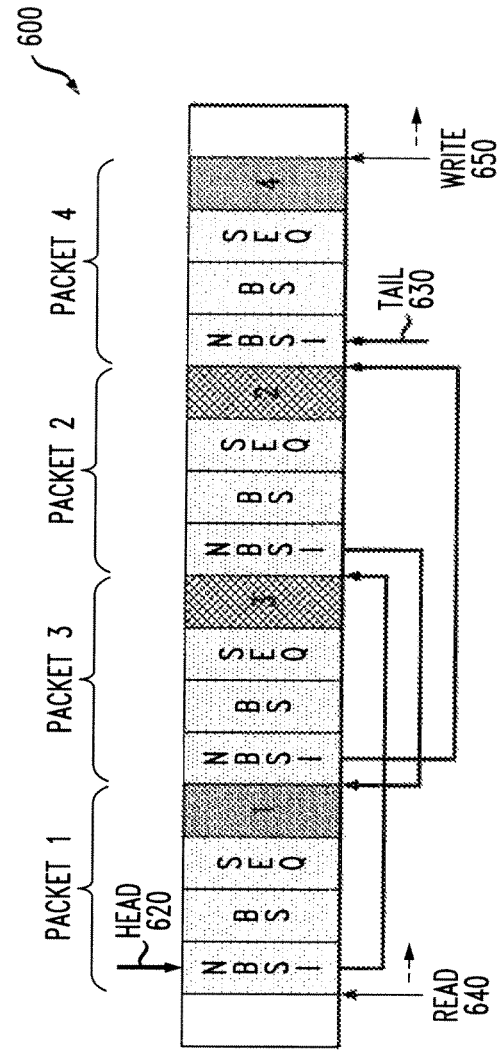
FIG. 6 illustrates the storage of four exemplary packets in a linked list circular buffer.
Figure 6:
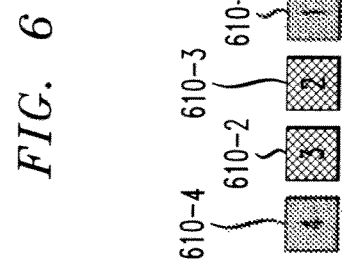

FIG. 6 illustrates the storage of four exemplary packets 610-1 through 610-4 in a linked list circular buffer 600. In the example of FIG. 6, the second packet 610-2 arrives out of sequence. The second packet 610-2 is stored in the linked list circular buffer 600 after the third packet 610-3, in the order of packet arrival, in a similar manner to the circular buffer 100 of FIG. 1. Internally, however, the NBSI field 540 of each data block will maintain the correct sequence, e.g., the NBSI value 540 of packet 610-1 will be modified to point to packet 610-2, rather than packet 610-3, when packet 610-2 arrives.

A head pointer 620 stores the location of a packet with the smallest sequence number in the linked list circular buffer 600 and a tail pointer 630 stores the location of a packet with the largest sequence number in the linked list circular buffer 600. The read pointer 640 points to the buffer position from which data will be read in the next read operation, and the write pointer 650 points to the buffer position where data can be written, in a similar manner to the circular buffer 100 of FIG. 1.

An exemplary re-ordering algorithm for the linked list circular buffer 600 may be performed as follows. First, create a variable, largest_seq, to store the location and sequence number for the packet having the largest sequence number. The tail pointer 630 points to the packet identified by largest_seq. In other words, the tail pointer 630 points to the tail of the ordered list (in the ordered list, the tail always has the largest sequence number).

If a newly arrived packet has a sequence number that is larger than the value stored in largest_seq, the newly arrived packet is linked to largest_seq and largest_seq is updated with the corresponding new values. Otherwise, each SEQ in the list is looked up, and the newly arrived packet is inserted into the proper position by updating the corresponding NBSI field. For example, if packet 5 arrives ahead of packet 4, packet 5 is stored ahead of packet 4 in the linked list circular buffer 600. Once packet 4 arrives, the NBSI field of packet 4 will point to the beginning of packet 5, which is the reordering operation. In most situations, the packets will arrive in sequence. Thus, the searching associated with the exemplary re-ordering algorithm will be reasonable.

A packet is read from the linked list circular buffer 600 in the following manner. The packet is obtained from the head 620 of the list, which always has the smallest sequence number. The buffer space of this read packet is then marked as "empty." The read pointer 640 will move forward to release the buffer if it currently points to a buffer marked as "empty."

Figure 7:
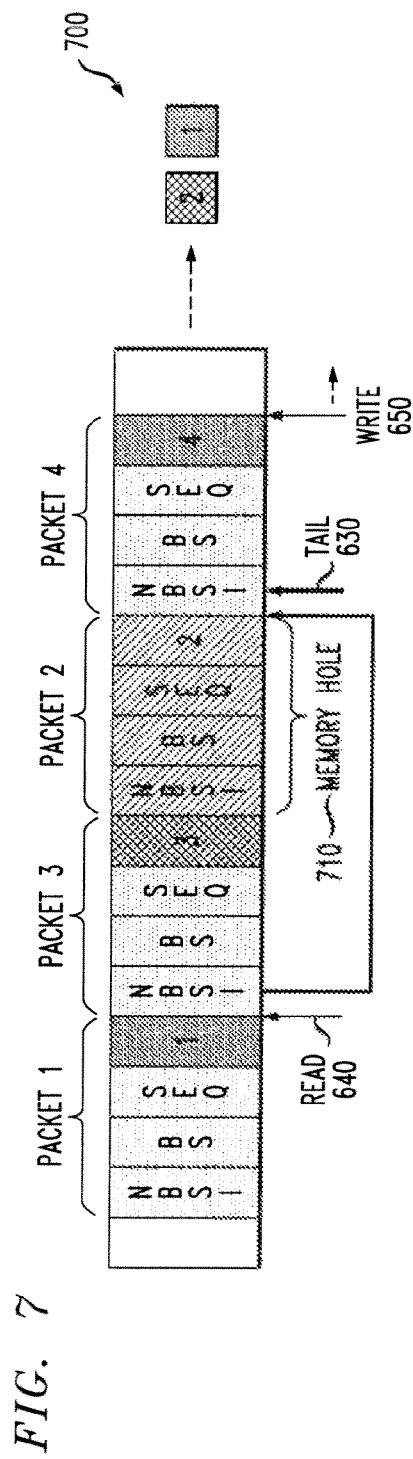
FIG. 7 illustrates a memory hole in a linked list circular buffer.

If a packet arrives out-of-sequence, the reading of this packet based on the order of the sequence number will create a "memory hole." FIG. 7 illustrates a memory hole 710 in a linked list circular buffer 700. The memory hole 710 is located in the middle of the read and write pointers 640, 650. Thus, the buffer spaces within the memory hole 710 are not available to newly arriving packets.

Figure 8:
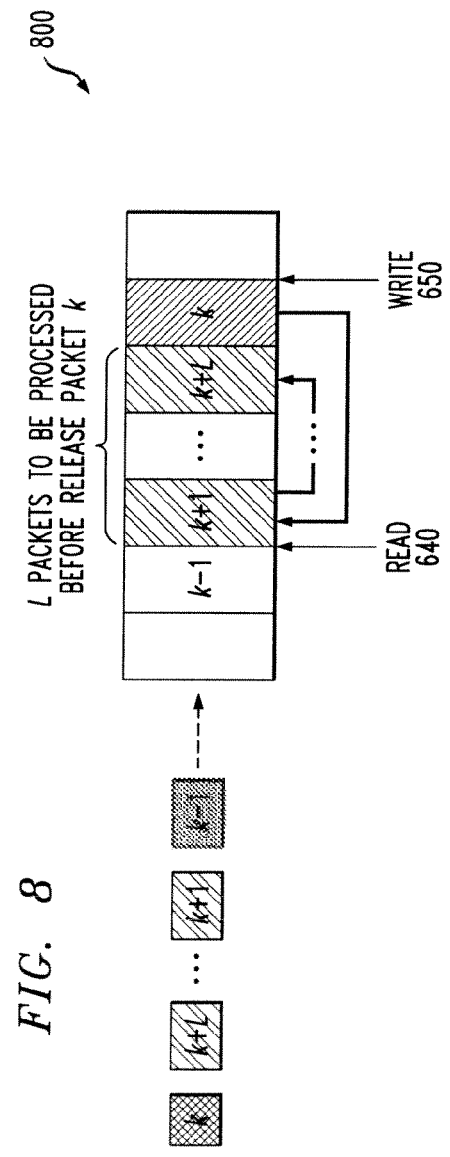
FIG. 8 illustrates the dissolving a memory hole in a linked list circular buffer in accordance with an aspect of the present invention.

According to a further aspect of the invention, the disclosed linked list circular buffers can "self-dissolve" a memory hole 710. FIG. 8 illustrates the dissolving of a memory hole 710 in a linked list circular buffer 800 in accordance with an aspect of the present invention. The memory hole 710 will disappear by itself with ongoing read and write operations. For example, if packet k arrives late by L packets, there will be L packets having a larger sequence number ahead of packet k in the buffer 800 before its space can be released, as shown in FIG. 8. Packet k is marked as "empty." Then, when the rest of the L packets are processed, the read pointer 640 will proceed to the buffer space for packet k, which is marked as "empty." In this case, the read pointer 640 will move forward and skip reading the buffer space, which releases the buffer and makes it available for writing new packets again. The disclosed "natural dissolving" of the memory hole 710 does not need an extra operation.

The cost of a memory hole 710 is that the part of memory associated with the memory hole 710 will not be available until the L packets are processed. If the amount of unavailable memory due to a memory hole 710 becomes prohibitive, a memory defragmentation operation can optionally be performed.

FIG. 9 illustrates a memory fragment in a linked list circular buffer 900. It is noted that a memory defragmentation operation generally copies memory. It can be shown that the optimal memory copy for defragmentation is a one-way copy, i.e., either copy the fragments towards the read pointer 640 or towards the write pointer 650. As shown in FIG. 9, the size of a memory fragment close to the read pointer 640 is referenced as $S_R$, and similarly the size of a memory fragment close to the write pointer 650 is referenced as $S_W$. In one exemplary implementation, the memory is copied towards the direction with MAX$\{S_R, S_W\}$, which will result in the least memory copy operations. For example, in FIG. 9, $S_R > S_W$. Thus, the memory is copied towards the read pointer 640.

FIG. 10 illustrates a memory defragmentation operation in accordance with an embodiment of the present invention. As shown in FIG. 10, the memory was copied towards the read pointer 640. Thus, the memory holes 710 appear after the write pointer 650.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A buffer memory, comprising:
   a plurality of continuous memory elements for storing data elements in an order of arrival along with sequence information for the data elements stored therein, wherein said plurality of continuous memory elements have a variable size, wherein each memory element comprises a pointer to another memory element in said plurality of continuous memory elements storing a next data element, wherein said variable size is determined when a corresponding data element is stored and is based on a size of said corresponding data element, wherein a memory hole in said buffer memory is dissolved by a read pointer moving forward to skip a reading of the memory element associated with the memory hole, and wherein said buffer memory is defragmented by copying one or more memory fragments toward a direction of the read pointer or a write pointer; and
   a largest sequence variable to store a sequence number of a data element in said buffer memory having a largest sequence number, wherein said largest sequence variable is updated if a newly arrived data element has a sequence number that is larger than said largest sequence variable.

2. The buffer memory of claim 1, wherein each memory element further comprises a block size field indicating said variable size, wherein said block size field is stored in a block header along with the sequence information for the data element.

3. The buffer memory of claim 1, wherein each memory element further comprises a sequence number field indicating a sequence number of said corresponding data element.

4. The buffer memory of claim 1, wherein said data element comprises a packet.

5. The buffer memory of claim 1, wherein said pointer comprises a next block starting index that points to a next packet in a sequence.

6. The buffer memory of claim 1, wherein said largest sequence variable further comprises a location of said data element in said buffer memory having a largest sequence number.

7. The buffer memory of claim 1, wherein said pointer is updated if a newly arrived data element has arrived out of sequence.

8. The buffer memory of claim 1, wherein a data element is read from said buffer memory by reading a data element from a head of an ordered list.

9. The buffer memory of claim 8, wherein said data element from said head of said ordered list has a smallest sequence number.

10. An integrated circuit, comprising:
    a buffer memory comprising a plurality of continuous memory elements for storing data elements in an order of arrival in addition to storing sequence information for a corresponding data element, wherein said plurality of continuous memory elements have a variable size and wherein each memory element comprises a pointer to another memory element in said plurality of continuous memory elements storing a next data element, wherein said variable size is determined when said corresponding data element is stored and is based on a size of said corresponding data element, wherein a memory hole in said buffer memory is dissolved by a read pointer moving forward to skip a reading of the memory element associated with the memory hole, and wherein said buffer memory is defragmented by copying one or more memory fragments toward a direction of the read pointer or a write pointer; and
    a largest sequence variable to store a sequence number of a data element in said buffer memory having a largest sequence number, wherein said largest sequence variable is updated if a newly arrived data element has a sequence number that is larger than said largest sequence variable.

11. The integrated circuit of claim 10, wherein each memory element further comprises a block size field indicating said variable size.

12. The integrated circuit of claim 10, wherein each memory element further comprises a sequence number field indicating a sequence number of said corresponding data element, wherein the sequence number of said corresponding data element is included in the sequence information.

13. The integrated circuit of claim 10, wherein said data element comprises a packet.

14. The integrated circuit of claim 10, wherein said pointer comprises a next block starting index that points to a next packet in a sequence.

15. The integrated circuit of claim 10, wherein said pointer is updated if a newly arrived data element has arrived out of sequence.

16. A method for managing a buffer memory, comprising:
storing data elements in a plurality of continuous memory elements based on order of arrival, wherein said plurality of memory elements have a variable size and store sequence information for a corresponding data element stored therein;
updating a pointer in each of said continuous memory elements to point to another memory element in said plurality of continuous memory elements storing a next data element, wherein said variable size is determined when said corresponding data element is stored along with the sequence information and is based on a size of said corresponding data element;
dissolving a memory hole in said buffer memory by a read pointer moving forward to skip a reading of the memory element associated with the memory hole;
defragmenting said buffer memory by copying one or more memory fragments towards a direction of the read pointer or a write pointer;
updating a largest sequence variable to store a sequence number of a data element in said buffer memory having a largest sequence number; and
updating said largest sequence variable if a newly arrived data element has a sequence number that is larger than said largest sequence variable.

17. The method of claim 16, further comprising the step of updating a block size field in each of said memory elements indicating said variable size.

18. The method of claim 16, further comprising the step of updating a sequence number field in each of said memory elements indicating a sequence number of said corresponding data element.

19. The method of claim 16, wherein said largest sequence variable further comprises a location of said data element in said buffer memory having a largest sequence number.

20. The method of claim 16, further comprising the step of updating said pointer if a newly arrived data element has arrived out of sequence.

21. The method of claim 16, further comprising the step of reading a data element from said buffer memory by reading a data element from a head of an ordered list.

* * * * *